(12) United States Patent
Luo

(10) Patent No.: US 12,146,622 B1
(45) Date of Patent: Nov. 19, 2024

(54) PORTABLE FOLDABLE LED GROW LIGHT

(71) Applicant: Weidong Luo, Guangxi (CN)

(72) Inventor: Weidong Luo, Guangxi (CN)

( * ) Notice: Subject to any disclaimer, the term of this patent is extended or adjusted under 35 U.S.C. 154(b) by 0 days.

(21) Appl. No.: 18/750,520

(22) Filed: Jun. 21, 2024

(30) Foreign Application Priority Data

Nov. 9, 2023 (CN) .......................... 202311481379.8

(51) Int. Cl.
| | |
|---|---|
| *F21L 14/00* | (2006.01) |
| *A01G 7/04* | (2006.01) |
| *F21V 1/06* | (2006.01) |
| *F21V 7/18* | (2006.01) |
| *F21Y 115/10* | (2016.01) |

(52) U.S. Cl.
CPC .............. *F21L 14/00* (2013.01); *A01G 7/045* (2013.01); *F21V 1/06* (2013.01); *F21V 7/18* (2013.01); *F21Y 2115/10* (2016.08)

(58) Field of Classification Search
CPC .. A01G 9/249; A01G 9/16; A01G 2009/1453; A01G 7/04; F21L 14/00; F21V 7/18; F21V 1/06; F21Y 115/10
See application file for complete search history.

(56) References Cited

U.S. PATENT DOCUMENTS 11,641,809 B2 * 5/2023 Gruskin ................. E04H 1/125
47/17

* cited by examiner

*Primary Examiner* — William J Carter

(57) ABSTRACT

The invention discloses a portable foldable LED grow light, comprising a flexible cloth, a flexible reflector, a flexible transparent lamp shade, a flexible LED lamp strip, a first male zipper, a first female zipper, a second male zipper, a second female zipper and a magnet block. The flexible reflector is set on the lower end wall of the flexible cloth, while the flexible transparent lampshade is set on its lower end wall, the flexible LED lamp strip is respectively removable and embedded in the storage slot. The first male and female zipper are respectively arranged on the opposite two side walls of the upper end of the flexible cloth, the second male and female zipper are respectively arranged on the other side walls, and the magnet block is respectively arranged around the upper end wall. The technical scheme of the invention can make the installation and fixing mode more flexible and convenient, achieve quick splicing, and be easily folded, occupying small space, convenient transportation and carrying, and effectively reduce light loss, improving the photosynthetic rate of plants.

8 Claims, 5 Drawing Sheets

PORTABLE FOLDABLE LED GROW LIGHT

FIELD OF THE INVENTION

The invention relates to the technical field of LED grow light, especially the portable foldable LED grow light.

BACKGROUND OF THE INVENTION

Light environment is one of the essential physical environmental factors for plant growth and development. Controlling plant morphology through light quality regulation is an important technology in the field of controlled cultivation. By providing photosynthetically active light to plants through plant growth lamps, it promotes plant growth, shortens the time required for flowering and fruiting, and improves production.

However, most of the existing plant growth lights on the market currently use a combination of large-area aluminum reflective panels and LED lights for illumination. This type of plant growth light has a low energy efficiency, high material consumption, and significant light loss, which affects the photosynthetic rate of plants. They are large and bulky, and cannot be folded, making them inconvenient for transportation and carrying. They can only be installed by lifting, which requires high installation site conditions. Additionally, the installation and fixation methods are relatively limited and cannot be flexibly adapted according to needs.

SUMMARY OF INVENTION

The main purpose of this invention is to propose a portable, foldable LED grow light, aimed at solving the technical problems of low energy efficiency, significant light loss, which affects the photosynthetic rate of plants, large size, inability to fold, inconvenience in transportation and portability, limited installation and fixation methods, and lack of flexibility in assembly and usage according to the needs of existing plant growth lights.

To achieve the aforementioned purpose, the portable foldable LED grow light comprises a flexible cloth, a flexible reflector, a flexible transparent lampshade, a flexible LED lamp strip, a first male zipper, a first female zipper, a second male zipper, a second female zipper, and a magnet block. The flexible reflector is positioned on the lower end wall of the flexible cloth, while the flexible transparent lampshade is mounted on the lower end wall of the flexible reflector. The flexible transparent lampshade is equipped with a plurality of sewing threads at parallel intervals. These sewing threads securely attach the flexible transparent lampshade to the flexible reflector, connecting two adjacent sewing threads, the lampshade, and the reflector. The reflector panels enclose to form a containment groove, with one end of the groove closed and the other end open. The flexible LED lamp strips are detachably inserted into the containment groove. The first male zipper and the first female zipper are situated on opposite sides of the upper end of the flexible cloth, while the second male zipper and the second female zipper are positioned on the other opposite sides. The magnetic blocks are evenly distributed around the perimeter of the upper end wall of the flexible cloth. With these modifications, the text is more concise, accurate, and follows the proper grammatical conventions.

Optionally, the system also includes a support rod structure. The upper end wall of the flexible cloth has four sides, each side featuring multiple evenly spaced support rings. A flexible cover plate is attached to each of the four top corners of the upper end wall of the flexible cloth. The center of the lower end wall of the flexible cover plate is securely sewn to the upper end wall of the flexible cloth, creating a small indentation or pocket between the two layers. The support rods can be threaded through the support rings and the ends of the rods can be inserted securely into the indentation or pocket created by the flexible cover plate and the upper end wall of the flexible cloth. The ends of adjacent support rods should be positioned to touch each other, forming a stable structure. Additionally, the front edge of the flexible cover plate, at each corner, features a concave hook hole for attachment or hanging purposes.

Optionally, it also includes Velcro straps, which are respectively arranged at the four top corners of the upper end wall of the flexible cloth.

Optionally, the flexible fabric is formed by Jiaji fabric.

Optionally, the flexible reflective panel is formed of aluminum foil.

Optionally, the flexible transparent lampshade is formed by PVC coated plastic cloth.

Optionally, the lower end wall of the flexible reflective plate is plated with a metal dielectric film layer.

Optionally, the lower end wall concave of the flexible cloth is provided with a limit slot, and the flexible reflective plate is arranged in the limit slot.

The technical scheme of the invention has the following beneficial effects:

1. The technical design of the invention incorporates a flexible cloth, a flexible reflector, a flexible transparent lampshade, and a flexible LED lamp strip, allowing for easy folding and subsequent compact storage. This ensures that the plant growth lamp occupies minimal space, greatly enhancing its portability and convenience for transportation and carrying.

2. The technical scheme of the invention involves the utilization of a flexible transparent lampshade crafted from PVC-coated plastic cloth, a flexible reflector composed of aluminum foil, and a metal dielectric film layer plated on the lower end wall of the reflector. This design effectively enhances the reflectivity of the light source, minimizing light loss and improving luminous efficiency. Additionally, it proficiently converts light energy into photosynthesizing active radiation, resulting in a uniform spectral energy distribution. This innovative scheme not only boosts the photosynthetic rate of plants but also boasts advantages such as high efficiency, energy conservation, compact size, lightweight construction, long-lasting durability, and straightforward installation. Its application in multi-layer cultivation three-dimensional combination systems enables low heat load and miniaturization of production space, ultimately enhancing seedling quality, improving the rate of high-quality seedlings, shortening the seedling cycle, and reducing energy consumption costs.

3. The technical design of the invention incorporates a male zipper and a female zipper, each located on opposing sides of the flexible cloth. This innovative feature enables a rapid and straightforward connection of multiple plant growth lamps, significantly enhancing convenience and simplifying the operation process.

4. The technical design of the invention incorporates magnet blocks arranged along the upper wall of the flexible cloth. This allows the plant growth lamp to be directly adsorbed and securely fixed to the lower end wall of the iron partition on the shelf where the plant is positioned. This feature facilitates rapid disassembly and convenient installation of the plant growth lamp.

5. The technical design of the invention incorporates sewing thread to divide the flexible transparent lampshade into multiple storage slots. One end of each storage slot is constructed in a closed configuration, while the other end remains open. This arrangement allows for the disassembly and subsequent embedding of the flexible LED lamp strip into the respective storage slots, greatly enhancing the convenience and speed of installation and disassembly. This innovative design facilitates the assembly, disassembly, replacement, and maintenance of the flexible LED lamp strip, simplifying the overall process.

6. The technical design of the invention incorporates multiple support rings protruding from the four sides of the upper wall of the flexible cloth. These support rings enable the detachable insertion of support rods, with both ends of the support rods securely nested within their respective receptacles. Additionally, the front end of the flexible cover plate features recessed hook holes, allowing the plant growth lamp to be hoisted and securely fixed using hanging ropes and hooks. This configuration not only simplifies installation but also ensures broad adaptability.

7. The technical approach of the invention incorporates the use of Velcro tape affixed to the four top corners of the upper wall of the flexible cloth. This allows the plant growth lamp to be securely fastened to the pillars surrounding a non-iron shelf through the Velcro tape, thereby enhancing the flexibility and convenience of the installation and fixing method. This approach offers simplified installation and broad adaptability.

BRIEF DESCRIPTION OF THE DRAWINGS

To furnish a more precise explanation of the embodiments of the current invention or the technical solutions within the prior art, a concise introduction to the accompanying drawings necessary for the embodiment or prior art description is provided below. It is evident that the drawings outlined hereunder serve as mere illustrations of some embodiments of the invention. For technicians in the pertinent field, without the need for creative labor, alternative drawings may be derived from the structures depicted in these drawings.

The realization of the purpose, functional characteristics and advantages of the invention will be further explained in conjunction with embodiment's and with reference to the attached drawings.

DETAILED DESCRIPTION OF THE PREFERRED EMBODIMENT'S

The following is a clear and complete description of the technical scheme in the embodiment of the invention in combination with the drawings attached to the embodiment of the invention. Obviously, the embodiment described is only a part of the embodiment of the invention, but not the whole embodiment. Based on the embodiments in the invention, all other embodiments obtained by ordinary technicians in the field without creative labor fall within the scope of protection of the invention.

It should be noted that all directional indications (such as up, down, left, right, front, back . . . ) in the embodiments of the present invention are only used to explain the relative position relationship and motion situation between components in a specific posture (as shown in the attached figure). If the specific attitude changes, the directional indication will also change accordingly.

In addition, the technical schemes between various embodiments can be combined with each other but must be based on what ordinary technicians in the art can achieve. When the combination of technical schemes is contradictory or cannot be realized, it should be considered that the combination of such technical schemes does not exist and is not within the scope of protection required by the invention.

The invention provides portable fold-able LED grow light.

Figure 1:
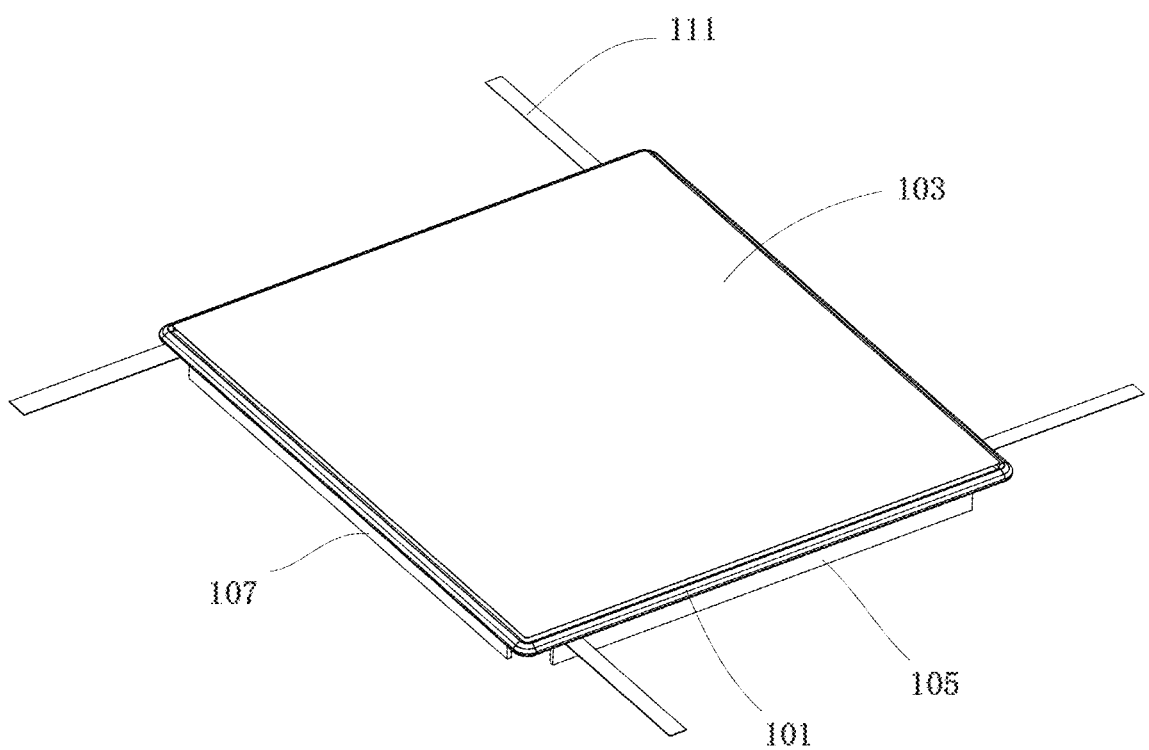
FIG. 1 is a schematic diagram of the overall structure of the portable folding LED grow light of an embodiment of the invention.
Figure 2:
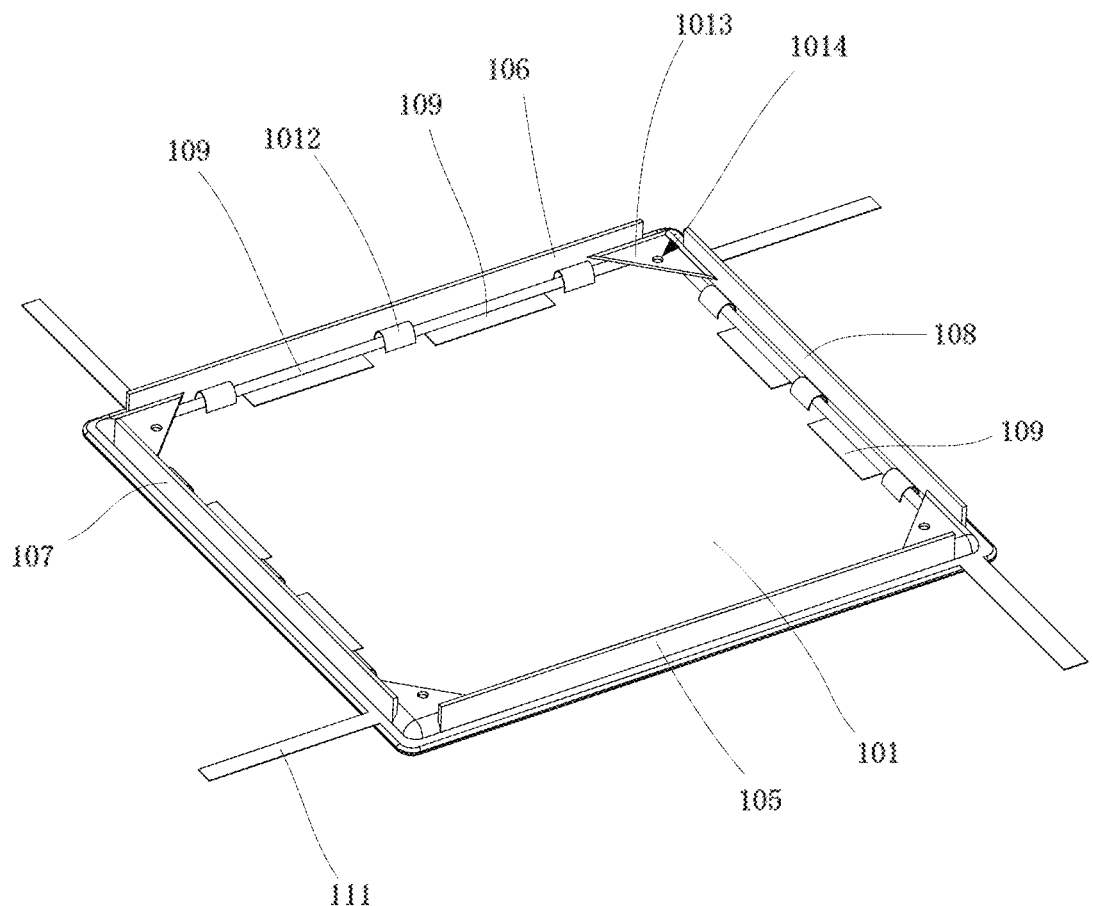
FIG. 2 is a schematic diagram of the overall structure of the portable folding LED grow light from another perspective of an embodiment of the invention.
Figure 3:
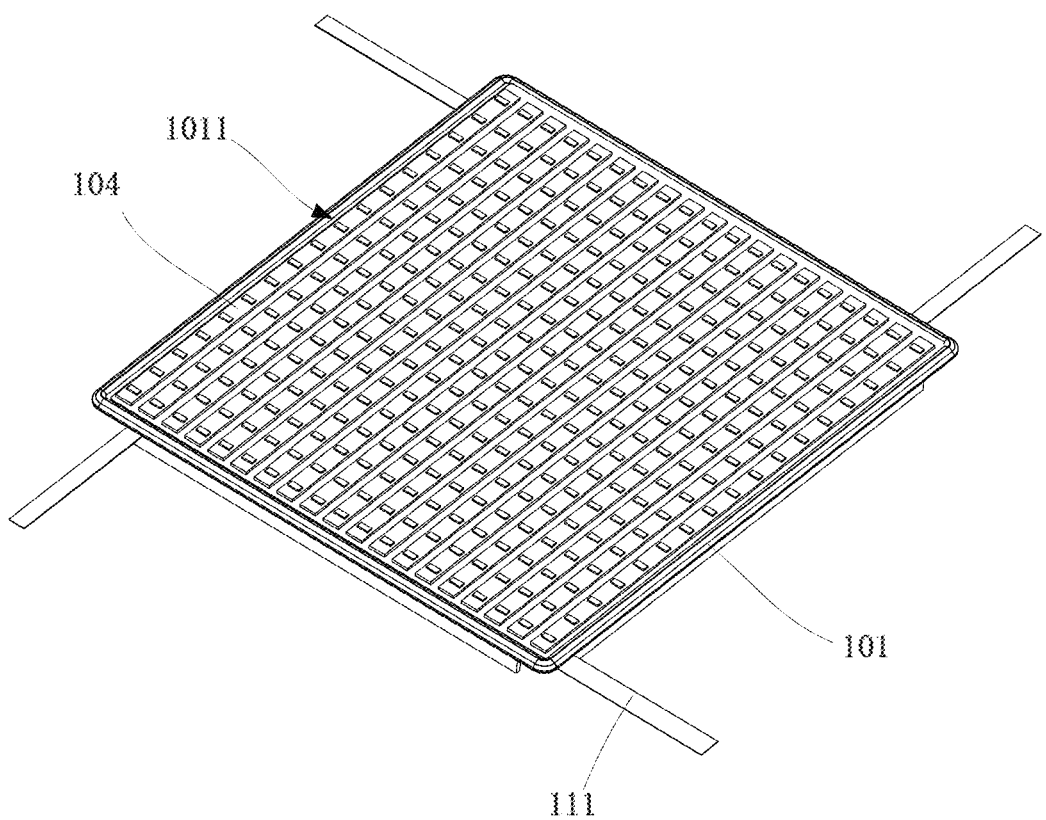
FIG. 3 is a partial structural diagram of the portable folding LED grow light of an embodiment of the invention.
Figure 4:
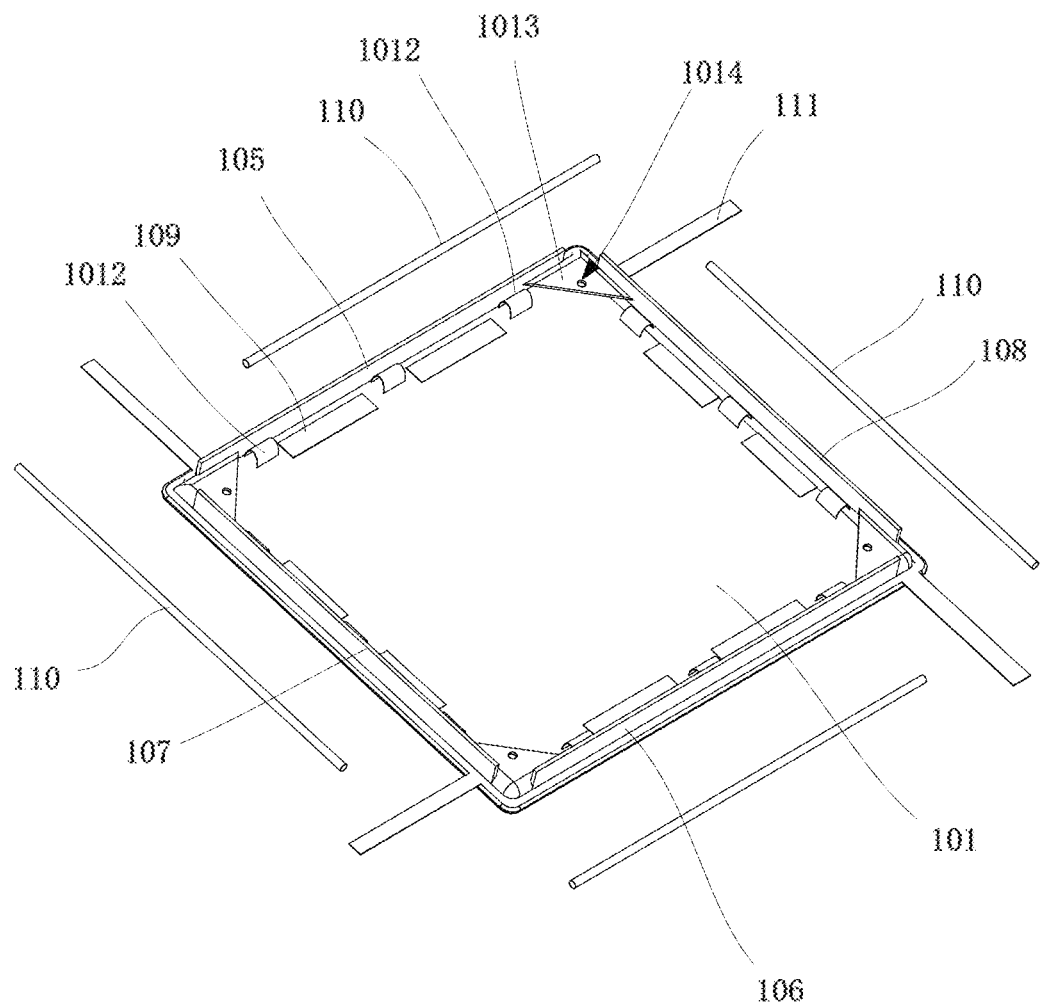
FIG. 4 is a decomposition structure diagram of the portable folding LED grow light of an embodiment of the invention.
Figure 5:
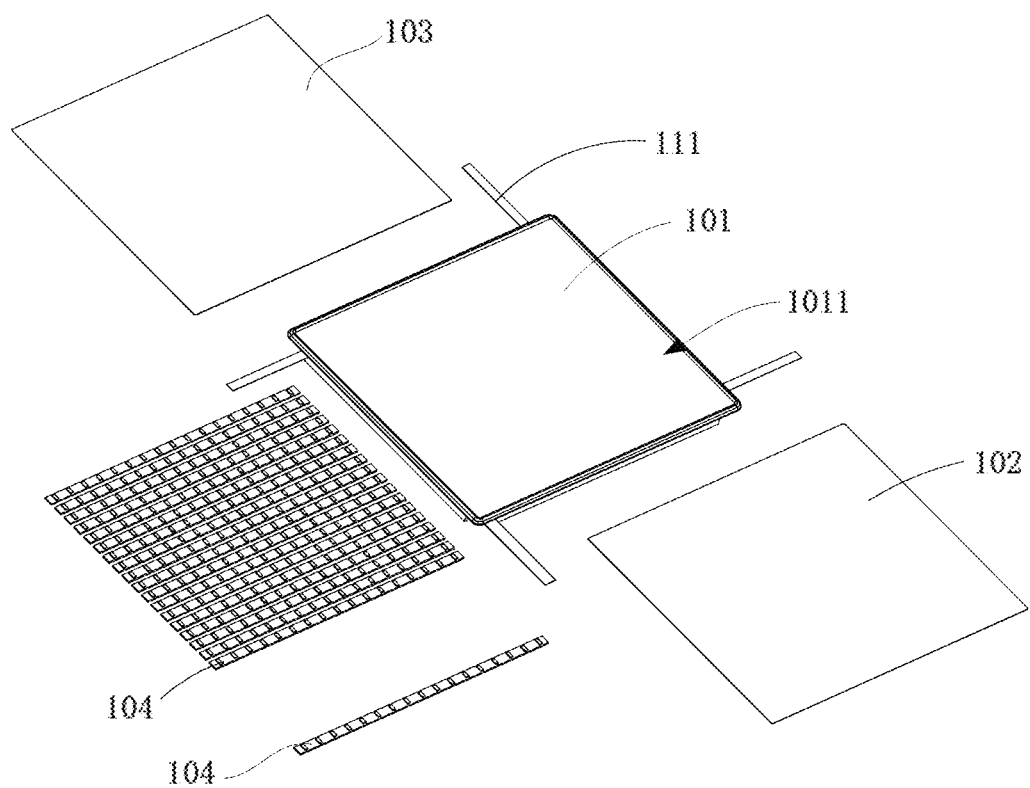
FIG. 5 is another schematic diagram of decomposition structure of the portable folding LED grow light of an embodiment of the invention.

As shown in FIGS. 1 to 5, in an embodiment of the invention, the portable fold-able LED grow light, it comprises a flexible cloth 101, a flexible reflector 102, a flexible transparent lampshade 103, a flexible LED light strip 104, a first male zipper 105, a first female zipper 106, a second male zipper 107, a second female zipper 108 and a magnet block 109. The flexible reflector 102 is arranged on the lower end wall of the flexible cloth 101, the flexible reflector 102 is arranged on the lower end wall of the flexible cloth 101, and the flexible transparent lampshade 103 is provided with a plurality of sewing threads at parallel intervals (not shown). The flexible transparent lampshade 103 and the flexible reflector 102 are fixed connected by sewing thread, and a storage slot is formed between the two adjacent sewing thread, the flexible transparent lampshade 103 and the flexible reflector 102 (not shown). One end of the storage slot is arranged in a closed structure, and the other end of the storage slot is arranged in an open structure. The flexible LED strip 104 is respectively removable and embedded in the storage slot. The first male zipper 105 and the first female zipper 106 are respectively arranged on the opposite sides of the upper end of the flexible cloth 101. The second male zipper 107 and the second female zipper 108 are arranged on the other opposite sides of the upper end of the flexible cloth 101, and a male zipper and a female zipper are arranged on the opposite sides of the flexible cloth, so that the two plant growth lamps can be quickly splice together. The magnet block 109 is arranged around the upper wall of the flexible cloth 101, so that the plant growth lamp can be directly adsorbed and fixed on the lower end wall of the iron partition of the shelf where the plant is placed through the magnet block, to realize the rapid disassembly of the plant growth lamp and make the use of the plant growth lamp more convenient.

The embodiment also comprises a support rod 110, four sides of the upper wall of the flexible cloth 101 are respectively convex with a plurality of support rings 1012, and four top corners of the upper wall of the flexible cloth 101 are respectively provided with a flexible cover plate 1013. The middle of the lower end wall of the flexible cover plate 1013 is fixedly connected with the upper end wall of the flexible cloth 101 through sewing thread respectively. A nest is formed between the lower end wall of the flexible cover plate 1013 and the upper end wall of the flexible cloth 101, and the support rod 110 is respectively detachable through the support ring 1012, and the two ends of the support rod 110 are respectively detachable embedded in the nest, and the ends of the adjacent two support rods 110 are connected to each other. The front end of the flexible cover plate 103 is respectively concave with hook holes 1014, which can be hooked on the hook holes through the hook at the lower end of the hanging rope, so as to realize the installation and fixing through the hanging rope, making the installation and fixing method of the plant growth lamp more flexible and convenient, wide adaptability, and the support rod can be disassembled, easy to transport and carry.

In this embodiment, the Velcro tape 111 is also provided at the four top corners of the upper wall of the flexible cloth 101, so that the plant growth lamp can be installed through the Velcro tape, so that when the shelf where the plant is placed is not made of iron material, it can be conveniently bound to the pillars around the shelf for installation and fixing. It makes the installation and fixing method of the plant growth lamp more flexible and convenient and has wide adaptability.

In this embodiment, the flexible fabric 101 is formed by the Jiayi fabric, which is a waterproof membrane fabric belonging to the knitted fabric category. It has excellent drape, safety and comfort, good smooth touch, and better breathability.

In this embodiment, the flexible reflector 102 is formed by aluminum foil, which is a soft metal film that not only has the advantages of moisture-proof, airtight, shading, abrasion resistance, fragrance preservation, non-toxic and tasteless, but also plays a role in light reflection, reducing light loss, withstanding high temperatures of 280-300 degrees Celsius, and playing a role in flame retardant, anti-corrosion, and thermal insulation.

In this embodiment, the flexible transparent lampshade 103 is formed by PVC coated plastic cloth, PVC coated plastic cloth is coated on the canvas with a layer of PVC containing glue, making its surface more smooth and completely waterproof, which is not easy to burn, high strength, climate change resistance and excellent geometric stability. There are also PVC coated plastic cloth can avoid oxidants, reducing agents and strong acid and alkali corrosion, PVC coated plastic cloth can be mildew resistant, moth resistant, there are obvious waterproof, compared with other types of canvas more waterproof, at low temperature is more soft, high tensile strength, relatively light weight and other advantages, it has waterproof, anti-corrosion, wear resistance, UV resistance and other characteristics. Resistant to 280-300 degrees of high temperature, effectively extend the life of the plant growth lamp.

In this embodiment, the lower end wall of the flexible reflector 102 is plated with a metal dielectric film layer. The metal dielectric film layer protects the flexible reflector to avoid oxidation of the flexible reflector in the air and reduce its performance. The metal dielectric film layer also plays a role in increasing the reflectivity of the surface of the flexible reflector. The metal dielectric film layer increases the reflectance of specific wavelength (or specific wave region), improves the reflectance of the flexible reflector, thereby reducing the light loss and improving the photosynthetic rate of the plant.

In this embodiment, the lower end wall concave of the flexible cloth 101 is provided with a limit slot 1011, and the flexible reflector plate 102 is arranged in the limit slot 1011.

The above is only a preferred embodiment of the invention and does not limit the scope of the patent of the invention. Under the invention idea of the invention, the equivalent structure transformation made by using the contents of the specification and drawings of the invention, or the direct/indirect application in other related technical fields are included in the scope of patent protection of the invention.

The invention claimed is:

1. Portable foldable LED grow light is characterized in that it comprises a flexible cloth, a flexible reflector, a flexible transparent lamp shade, a flexible LED lamp strip, a first male zipper, a first female zipper, a second male zipper, a second female zipper and a magnet block, the flexible reflector is arranged on the lower end wall of the flexible cloth, the flexible transparent lampshade is arranged on the lower end wall of the flexible reflector, the flexible transparent lampshade is arranged with a plurality of sewing threads at parallel intervals, and the flexible transparent lampshade and the flexible reflector is fixed connected through the sewing thread, a storage slot is formed between the two adjacent sewing threads, the flexible transparent lamp shade and the flexible reflector plate, one end of the containment slot is arranged in a closed structure, and the other end of the containment slot is arranged in an open structure, the flexible LED lamp strip is respectively removable and embedded in the containment slot, the first male zipper and the first female zipper are respectively arranged on two sides of the upper end of the flexible cloth, the second male zipper and the second female zipper are respectively arranged on two sides of the upper end of the flexible cloth, and the magnet block is respectively arranged around the upper end wall of the flexible cloth.

2. According to claim 1, the portable foldable LED grow light is characterized in that it also includes a support rod, the four sides of the upper wall of the flexible cloth are respectively convex with a plurality of support rings, and the four top corners of the upper wall of the flexible cloth are respectively provided with a flexible cover plate, the middle of the lower end wall of the flexible cover plate is fixedly connected with the upper end wall of the flexible cloth through a sewing thread, and a nest is formed between the lower end wall of the flexible cover plate and the upper end wall of the flexible cloth, the support rod is detachable through the support ring setup, and the two ends of the support rod are detachable embedded in the nesting, the ends of the two adjacent support rods are arranged to touch each other, and the front end of the flexible cover plate is respectively concave with hook holes.

3. The portable foldable LED grow light described in claim 1 is characterized in that it also includes a Velcro tape arranged at four top corners of the upper wall of the flexible cloth.

4. The portable foldable LED grow light described in claim 1 is characterized in that the flexible cloth is formed by a product cloth called Jiaji cloth.

5. The portable foldable LED grow light described in claim 1 is characterized in that the flexible reflector is formed by aluminum foil.

6. The portable foldable LED grow light described in claim 5 is characterized in that the lower end wall of the flexible reflector is plated with a metal dielectric film layer.

7. The portable foldable LED grow light described in claim 1 is characterized in that the flexible transparent lampshade is formed with a PVC coated plastic cloth.

8. According to claim 1, the portable foldable LED grow light is characterized in that the lower end wall of the flexible cloth is provided with a limit slot, and the flexible reflector is arranged in the limit slot.

* * * * *